US011315256B2

(12) United States Patent
Norris

(10) Patent No.: US 11,315,256 B2
(45) Date of Patent: Apr. 26, 2022

(54) DETECTING MOTION IN VIDEO USING MOTION VECTORS

(71) Applicant: Microsoft Technology Licensing, LLC, Redmond, WA (US)

(72) Inventor: Ian Stuart Norris, Warwickshire (GB)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 230 days.

(21) Appl. No.: 16/212,501

(22) Filed: Dec. 6, 2018

(65) Prior Publication Data
US 2020/0184652 A1 Jun. 11, 2020

(51) Int. Cl.
G06T 7/20 (2017.01)
G06T 7/11 (2017.01)
G06T 7/00 (2017.01)

(52) U.S. Cl.
CPC .............. *G06T 7/20* (2013.01); *G06T 7/0002* (2013.01); *G06T 7/11* (2017.01); *G06T 2207/20021* (2013.01)

(58) Field of Classification Search
None
See application file for complete search history.

(56) References Cited

U.S. PATENT DOCUMENTS

| | | | | |
|---|---|---|---|---|
| 7,142,600 B1 * | 11/2006 | Schonfeld | ............... | H04N 19/51 375/240.16 |
| 7,447,337 B2 * | 11/2008 | Zhang | ................ | G06K 9/00711 382/107 |
| 7,545,989 B1 * | 6/2009 | Dumitras | .................. | G06T 7/40 382/233 |
| 7,577,199 B1 * | 8/2009 | Herz | ................ | G08B 13/19608 348/143 |
| 7,634,406 B2 * | 12/2009 | Li | ........................... | G10L 15/19 704/243 |
| 8,085,849 B1 * | 12/2011 | Ratner | ................. | H04N 19/543 375/240.16 |
| 8,090,022 B2 * | 1/2012 | Zhang | .................... | H04N 19/17 375/240.16 |
| 8,588,306 B2 * | 11/2013 | Nair | ....................... | H04N 19/53 375/240.16 |
| 8,644,557 B2 * | 2/2014 | Kim | ......................... | G06T 7/77 382/103 |

(Continued)

OTHER PUBLICATIONS

Yokoyama, et al.; "Motion Vector Based Moving Object Detection and Tracking in the MPEG Compressed Domain"; 2009 Seventh International Workshop on Content-Based Multimedia Indexing; 2009; pp. 201-206; DOI 10.1109/CBMI.2009.33; IEEE.

(Continued)

*Primary Examiner* — Gandhi Thirugnanam

(57) ABSTRACT

Technology is disclosed herein for detecting motion in video using motion vectors. In an implementation, a frame of video is divided into regions and a vector score is identified for each of the regions. A selection is then made of a subset of the regions based on the identified vector scores, i.e. at least some of the regions may be excluded from further analysis based on their score. The selected subset is divided into or grouped in clusters. Motion may then be identified in response to at least one of the clusters appearing in at least one other frame of the video.

20 Claims, 15 Drawing Sheets

(56) References Cited

U.S. PATENT DOCUMENTS

| | | | | |
|---|---|---|---|---|
| 8,861,603 | B2* | 10/2014 | Lertrattanapanich | H04N 19/577 375/240.16 |
| 2002/0114394 | A1* | 8/2002 | Ma | H04N 19/51 375/240.16 |
| 2003/0004652 | A1* | 1/2003 | Brunner | A01K 1/031 702/19 |
| 2003/0189980 | A1* | 10/2003 | Dvir | H04N 19/53 375/240.16 |
| 2004/0170326 | A1* | 9/2004 | Kataoka | G06T 7/74 382/209 |
| 2005/0207630 | A1* | 9/2005 | Chan | A61B 6/583 382/131 |
| 2006/0110048 | A1* | 5/2006 | Charlin | G06K 9/4638 382/224 |
| 2008/0273806 | A1* | 11/2008 | Friedrichs | G06T 7/215 382/236 |
| 2009/0175496 | A1* | 7/2009 | Kondo | G06K 9/32 382/103 |
| 2011/0188751 | A1* | 8/2011 | Litvin | G06T 7/155 382/173 |
| 2011/0222778 | A1* | 9/2011 | Zhang | G06K 9/3241 382/191 |
| 2013/0251045 | A1* | 9/2013 | Gu | H04N 19/521 375/240.16 |
| 2014/0270526 | A1* | 9/2014 | Wu | G06K 9/348 382/177 |
| 2014/0327819 | A1* | 11/2014 | Wu | H04N 19/194 348/441 |
| 2015/0163493 | A1* | 6/2015 | Huang | G06T 7/215 375/240.03 |
| 2017/0345150 | A1* | 11/2017 | Sun | G06T 7/62 |
| 2018/0082132 | A1* | 3/2018 | Spampinato | G08G 1/09626 |
| 2020/0184652 | A1* | 6/2020 | Norris | G06T 7/0002 |
| 2020/0221122 | A1* | 7/2020 | Ye | H04N 19/176 |

OTHER PUBLICATIONS

"Algorithms benchmark", Retrieved from: https://github.com/andrewssobral/bgslibrary/wiki/Algorithms-benchmark, Retrieved Date: Aug. 9, 2018, 2 Pages.

"Motion Vector extraction from encoded video file", Retrieved from: https://stackoverflow.com/questions/19993733/motion-vector-extraction-from-encoded-video-file, Nov. 15, 2013, 3 Pages.

"Trying to program motion detection in C using motion vectors", Retrieved from: https://forum.videohelp.com/threads/237264-Trying-to-program-motion-detection-in-C-using-motion-vectors, Mar. 19, 2006, 3 Pages.

Yokoyama, et al., "Motion Vector Based Moving Object Detection and Tracking in the MPEG Compressed Domain", In Proceedings of Seventh International Workshop on Content-Based Multimedia Indexing, Jun. 3, 2009, pp. 201-206.

Chen, et al., "Progressive Motion Vector Clustering for Motion Estimation and Auxiliary Tracking", In Proceedings of ACM Transactions on Multimedia Computing Communications and Applications, vol. 11, Issue 3, Jan. 2015, pp. 1-23.

"International Search Report and Written Opinion Issued in PCT Application No. PCT/US19/063486", dated Feb. 18, 2020, 12 Pages.

* cited by examiner

FIGURE 5

DETECTING MOTION IN VIDEO USING MOTION VECTORS

TECHNICAL FIELD

Aspects of the disclosure are related to the field of video analysis, and in particular, to detecting motion in video.

BACKGROUND

The automatic detection of motion is a useful feature of many video analysis systems. Motion detection may be used in the context of video surveillance, for example, to alert on movement in a particular scene. In other examples, motion detection may be used to determine when to record video, in autonomous vehicle applications, and in many other contexts.

Frame-based motion detection is a technique that compares the background and foreground of one frame to those of one or more other frames. Differences in the background or foreground may indicate the presence of motion in a scene. Unfortunately, such motion detection is a slow process that typically takes 12-35 ms to perform on a 1080p stream by a single central processing unit (CPU). Thus, the cost to perform such analysis by a single CPU on multiple streams would be prohibitively expensive from a performance standpoint.

OVERVIEW

Technology is disclosed herein for detecting motion in video using motion vectors. In an implementation, a frame of video is divided into regions and a vector score is identified for each of the regions. A selection is then made of a subset of the regions based on the identified vector scores, i.e. at least some of the regions are excluded from further analysis based on their score. The selected subset is divided into or grouped in clusters. Motion may then be identified in response to at least one of the clusters appearing in at least one other frame of the video.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, like reference numerals in the drawings designate corresponding parts throughout the several views. While several embodiments are described in connection with these drawings, the disclosure is not limited to the embodiments disclosed herein. On the contrary, the intent is to cover all alternatives, modifications, and equivalents.

FIG. 5 illustrates cluster tracking in an implementation.

DETAILED DESCRIPTION

Figure 1:
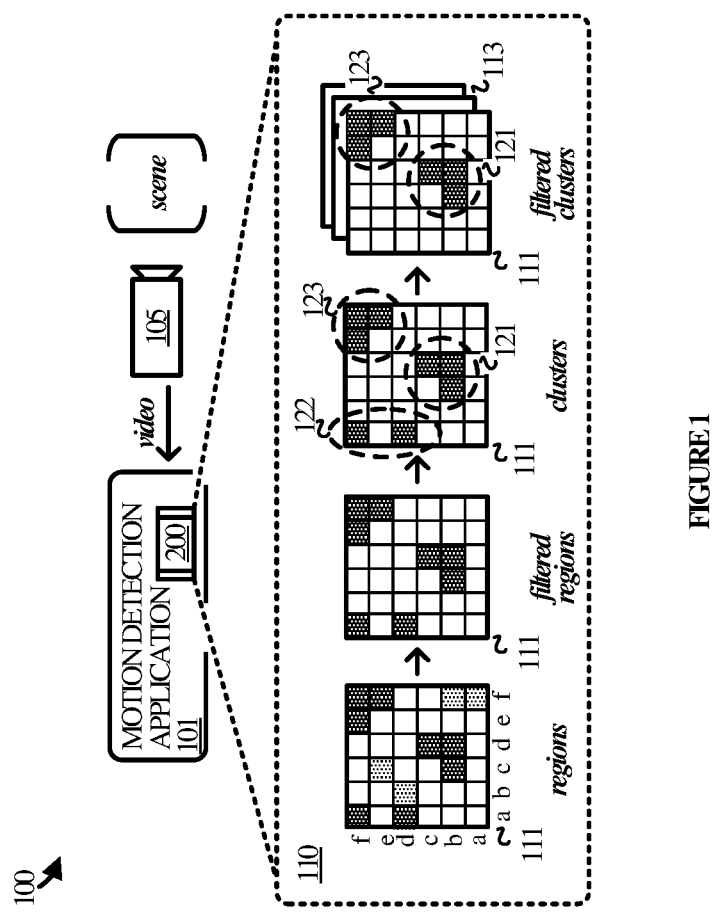
FIG. 1 illustrates an operational environment in an implementation.

Motion vectors are used herein for the automatic detection of motion in video. In various implementations, motion vectors are produced when video of a scene is captured and encoded. Motion vectors typically describe the displacement of a macroblock from one frame to another and thus may be leveraged to make encoding and decoding more efficient. In an advance, the motion vectors are leveraged to detect when motion is occurring in the scene.

Detecting motion includes dividing a frame of video into regions and assigning motion vectors to each region. Next, a vector score is calculated for each region. The vector score may be, for example, an average of all of the motion vectors of the frame that fall within a given region, a sum of the vectors, or any other scalar value that may be compared against criteria. In any case, all of the motion vectors in the region or only a subset of the vectors may be used. For instance, as many as ¾ to ⅞ of the motion vectors may be discarded and excluded from the calculation of the vector score.

The regions are then filtered based on their vector scores. That is, at least some of the regions are excluded from further analysis based on whether their scores satisfy one or more criteria, such as a threshold value. Such filtering further reduces the amount of data needed to detect motion.

The remaining regions are grouped into clusters based on their mean distance from each other using a k-means clustering algorithm. Each cluster is assigned a compactness score that represents how close the regions of the cluster are to each other. The clusters are then filtered to exclude those that fail to satisfy one or more criteria, such as a threshold compactness score, further reducing the amount of data.

Finally, the remaining cluster(s) are tracked to determine if they appear in one or more other frames of the video. For instance, one or more clusters of motion vectors may be identified in subsequent frames of the video and compared against the subject frame. If the same (or similar) cluster is present in one or more of the subsequent frames, then motion may be determined to have occurred. The same cluster may be in the same location as the original cluster or it may be displaced from the original location. In some cases, a certain amount of displacement may be further indicative of motion. The amount of overlap of two clusters from one frame to the next may also be indicative of motion (or lack thereof).

The motion detection technology disclosed herein has the technical effect of substantially speeding up motion detection. Filtering the regions reduces the amount of data to be considered, as does filtering the number of motion vectors used in the region filtering. Filtering the clusters further reduces the amount of data to consider. In trials, the motion detection algorithm took approximately 3 ms to execute on images from cameras with high digital noise, while exporting the motion vectors to the algorithm added 1-2 ms to the total time. In trials with low noise cameras, this total was reduced to less than 1 ms on average, including motion vector export time. This technique may be up to 10× faster to execute than an equivalent image comparison technique for cameras with low digital noise.

FIG. 1 illustrates an operational environment 100 in an implementation to better describe the enhanced motion detection considered herein. Operational environment 100 includes motion detection application 101 (hereinafter application 101) and video capture device 105. Video capture device 105 captures vide of a scene, encodes the video, and communicates the encoded video to application 101. Application 101 processes the video to detect motion that may be represented therein, such as the movement of a figure, an object, or the like.

Figure 8:
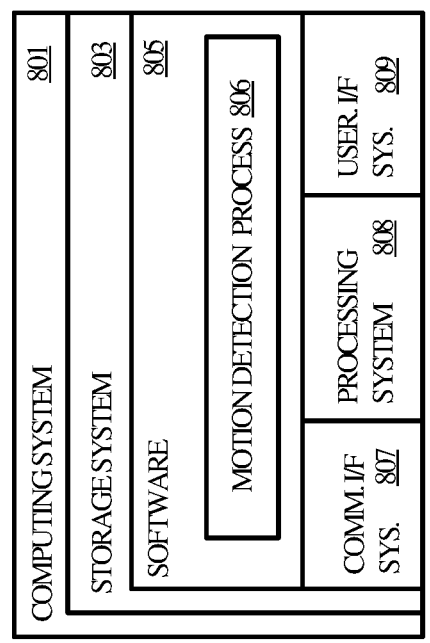
FIG. 8 illustrates a computing system suitable for implementing the various operational environments, architectures, processes, scenarios, and sequences discussed below with respect to the Figures.

Application 101 may be implemented on one or more computing systems or devices, of which computing system 801 in FIG. 8 is representative. Examples of such computers include, but are not limited to, desktop computers, laptop computers, server computers, and other physical or virtual computing devices. In some cases, application 101 may be implemented in the context of an application-specific device, such as a video surveillance camera. In fact, application 101 may be implemented in video capture device 105 in some implementations and/or video capture device 105 may be integrated with the computing system on which application 101 implemented.

Application 101 may be implemented as a stand-alone application but may also be integrated in another application. Application 101 may be a native application, a browser-based application, a mobile application, or any other type of software application. Application 101 may be implemented in firmware or hardware in some cases.

Figure 2:
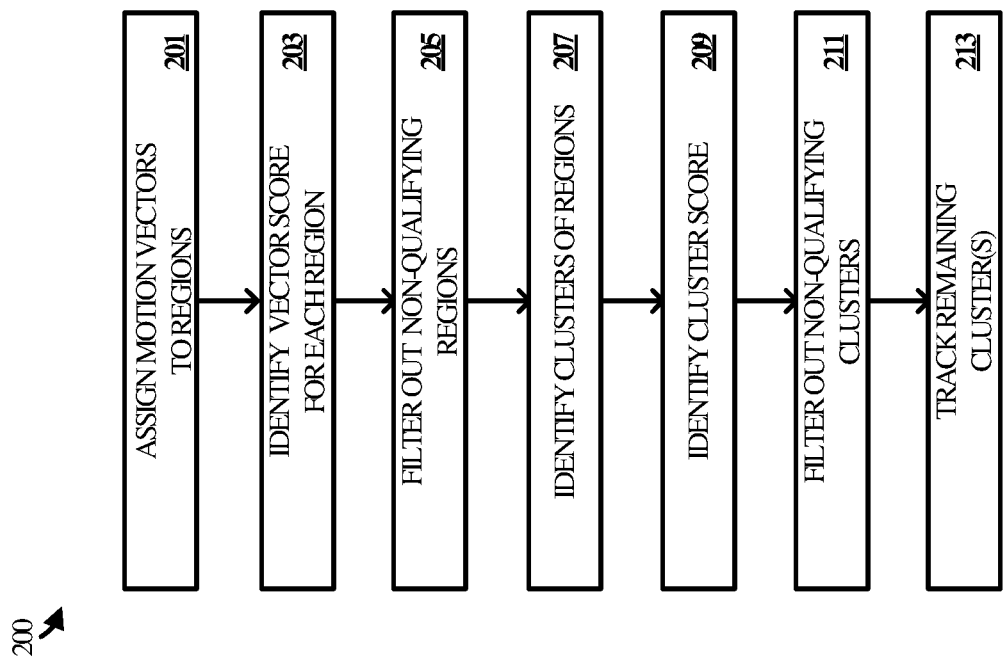
FIG. 2 illustrates a motion detection process in an implementation.

Application 101 employs a motion detection process 200 to detect motion in video. Motion detection process 200 may be implemented in program instructions in the context of any of the modules, components, or other such programming elements of application 101. The program instructions direct the underlying physical or virtual computing system(s) to operate as described for motion detection process 200, referring parenthetically to the steps in FIG. 2.

In operation, application 101 receives the video and divides a given frame into regions. Motion vectors are extracted from the encoded video and assigned to the regions (step 201). In some implementations, motion vectors may be extracted for the p-frames and/or b-frames of the video, although they may not be available for the i-frames (key frames).

Assigning the motion vectors may include mapping their pixel coordinates to the regions. The frame may be divided into a 32×32 grid, or any other suitable dimensions, with the cells of the grid encompassing or corresponding to certain pixel ranges in the video frame. As the frame itself was encoded with motion vectors, application 101 is able to identify those of the motion vectors located in each of the regions. Application 101 then identifies a vector score for each region (step 203). For instance, application 101 may calculate the average vector for each region, a sum of the vectors in each region, or some other magnitude that can be compared against a threshold value.

The grid size chosen will dictate the granularity of objects that can be tracked, along with the associated cost in tracking them. Objects significantly smaller than the grid size are unlikely to be identified. A high-density grid will increase the runtime cost of the motion detection proportional to the total grid regions, as such the grid size should be determined based on the usage and location of the camera In some implementations, the threshold value may be set programmatically to a static value. In other cases, the threshold value may be dynamic, such that it can change based on an analysis of the performance of the motion detection over time. The threshold value could also change based on time of day, environmental factors, or other dynamics that may influence the performance of the system.

Application 101 next identifies a subset of the regions to include in clusters based on the identified vector scores. Non-qualifying regions are filtered out (step 205) and the remaining regions are organized into clusters (step 207). The clustering may be accomplished using a k-means clustering algorithm, for example, or any other suitable algorithm.

Optionally, each cluster may be assigned a compactness score that represents the closeness of each region in the cluster to each other (step 209). When such scores are produced, non-qualifying clusters may be filtered out (step 211), further reducing the data set.

Lastly, the remaining clusters of motion vectors are tracked across frames (step 213). The presence of the same cluster (or a different cluster positioned similarly) in one or more other frames may be considered indicative of motion in the scene. The cluster may be in the same position or may be displaced in the subsequent frame relative to the first frame.

Referring back to FIG. 1, operational scenario 110 presents an example of motion detection process 200. Operational scenario 110 includes frame 111, which is representative of a frame of video. Frame 111 has been divided into regions, each of which may be referred to by its alphabetical coordinates. The empty regions indicate regions of little to no motion vectors, whereas the pattern-filled regions indicate the presence of motion vectors. The darker pattern indicates a vector score that satisfied a threshold, whereas the lighter pattern indicates a vector score that fails to satisfy the threshold. Next, the regions are filtered based on their relative scores. As such, the regions with the lighter pattern are filtered out, while the regions with the darker pattern remain.

The remaining regions are then organized into clusters, represented by cluster 121, cluster 122, and cluster 123. The clusters themselves may also be scored (optional) and filtered out (optional). In this example, cluster 122 is filtered-out because its regions are spaced relatively far apart. Cluster 121 and cluster 123 remain, which may be compared against clusters that appear in subsequent video frames 113 to detect the presence of motion.

Figure 3A:
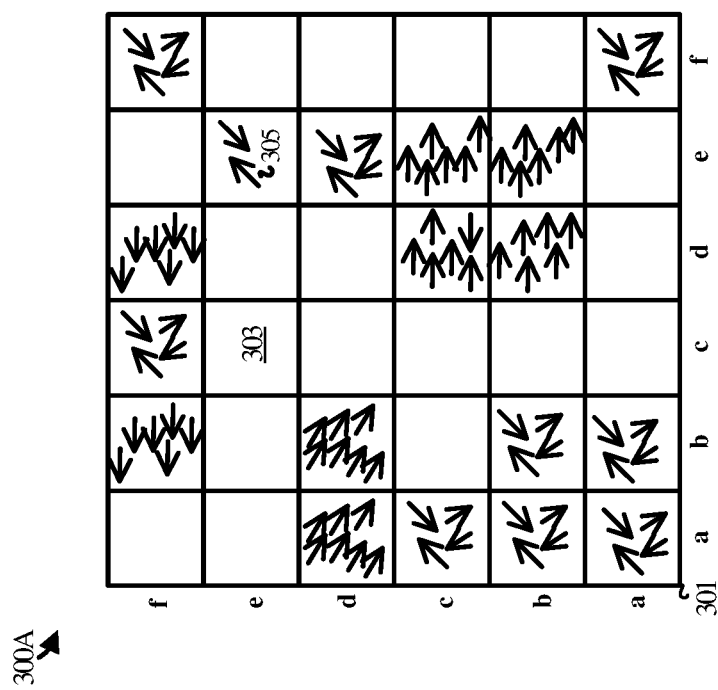
FIGS. 3A-3B illustrate region selection in an implementation.

FIG. 3A illustrates the selection of regions in an operational scenario. Step 300A of the operational scenario includes video frame 301 which has been divided into thirty-six regions (6×6). Region 303 is representative of the regions, each of which may be referred to in terms of its coordinates in the grid, where the x-axis is defined in terms of a-f, as is the y-axis.

Various motion vectors, of which vector 305 is representative, are included in the video frame 301. The motion vectors are a byproduct of the encoding of the raw video. Application 101 may extract the motion vectors from the encoded video in order to perform the motion detection described herein.

As part of the motion detection, application 101 identifies the motion vectors in each region and scores the regions based on their motion vectors. All of the motion vectors may be used for a given region, although less than all may also be used. For instance, as few as one-quarter or one-eighth of the motion vectors may be used to calculate the score for a region.

Figure 3B:

FIG. 3B illustrates a second step 300B of the operational scenario. At step 300B, the vectors scores have been calculated and are represented. It may be assumed for exemplary purposes that the average, the sum, or some other magnitude of the vectors in each region has been calculated. Several of the regions have resulted in a NULL score, since their motion vectors canceled each other out. What remains are eight regions where the scores satisfied a threshold. Moving forward, the data set is reduced to only these regions (a-d, b-f, b-d, d-b, d-c, d-f, e-b, and e-c).

Figure 4A:
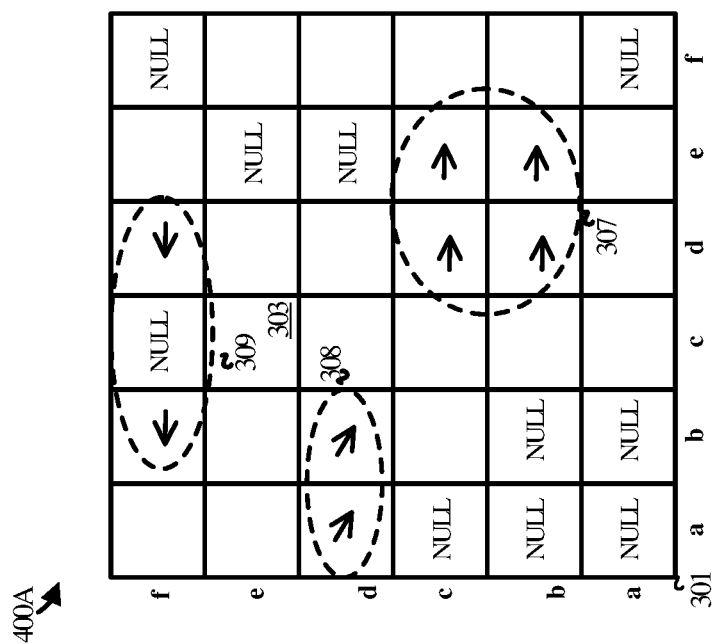
FIGS. 4A-4B illustrate cluster selection in an implementation.
Figure 4B:

FIG. 4A illustrates a first step 400A in the clustering process. Here, three clusters of regions are identified: cluster 307, cluster 308, and cluster 309. Next, a compactness score is calculated for each. Both cluster 307 and cluster 308 are relatively compact. However, cluster 309 has a compactness that falls below an exemplary threshold. Accordingly, cluster 309 is removed from consideration, as illustrated in the second step 400B of the process in FIG. 4B. Here, only two clusters remain to be tracked.

Figure 5:
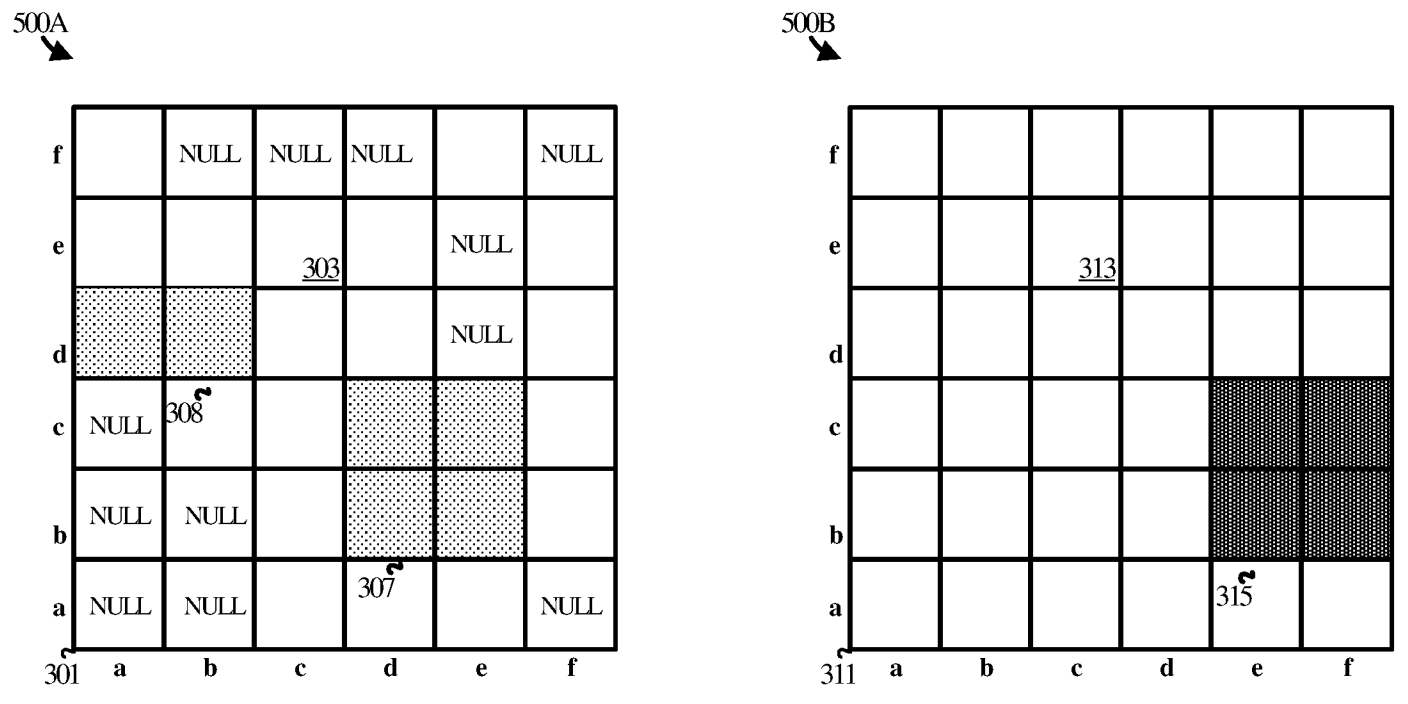

FIG. 5 illustrates the tracking process. In a first step 500A, the two clusters from FIG. 4B have been identified. The second step 500B of the process illustrates a subsequent frame 311 in the video. Frame 311 has also been divided into a grid of regions, of which region 313 is representative. In addition, its regions and clusters have been filtered. What remains is a single cluster comprised of the following regions: e-b; e-c; f-b; and f-c.

The remaining cluster may be compared against the two clusters in frame 301. Indeed, the new cluster is the same as (or similar to) one of the clusters in the original frame. Accordingly, it may be concluded that motion is occurring in the scene.

FIGS. 6A-6D illustrates a bounding box operation in an alternative example. In step 600A, a cluster 603 of regions has been identified in frame 601. Frame 601 has been divided into regions defined by a grid. At step 600B in FIG. 6B, a bounding box 605 is calculated for cluster 603 and may be visualized as drawn around it. The bounding box 605 may be tracked across frames, too.

Figure 6A:
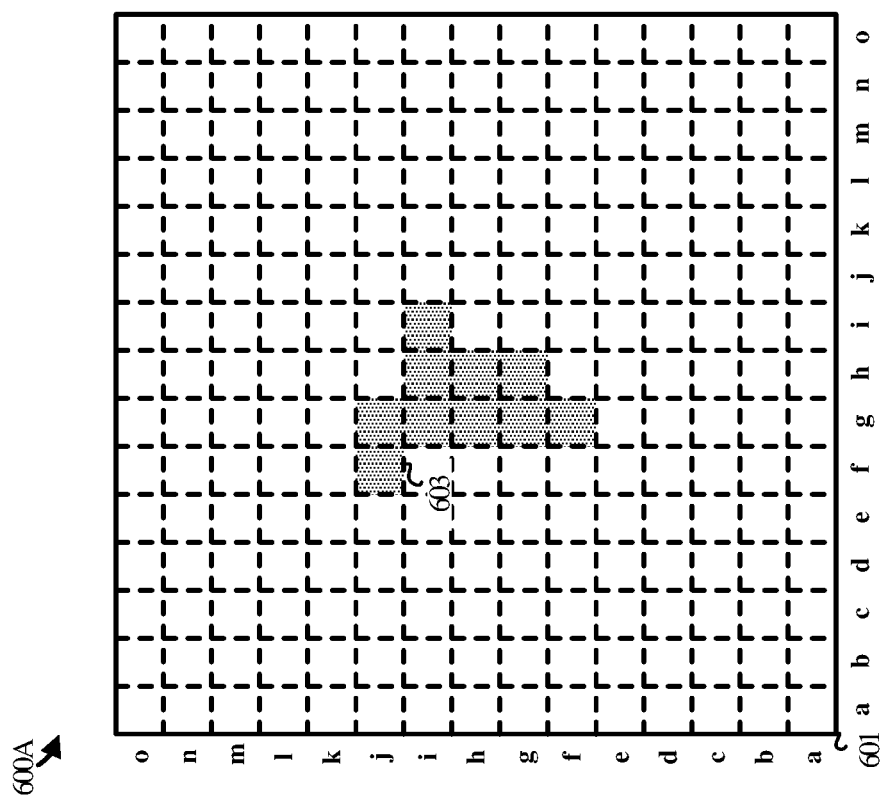
FIGS. 6A-6D illustrate box bounding and tracking in an implementation.
Figure 6B:
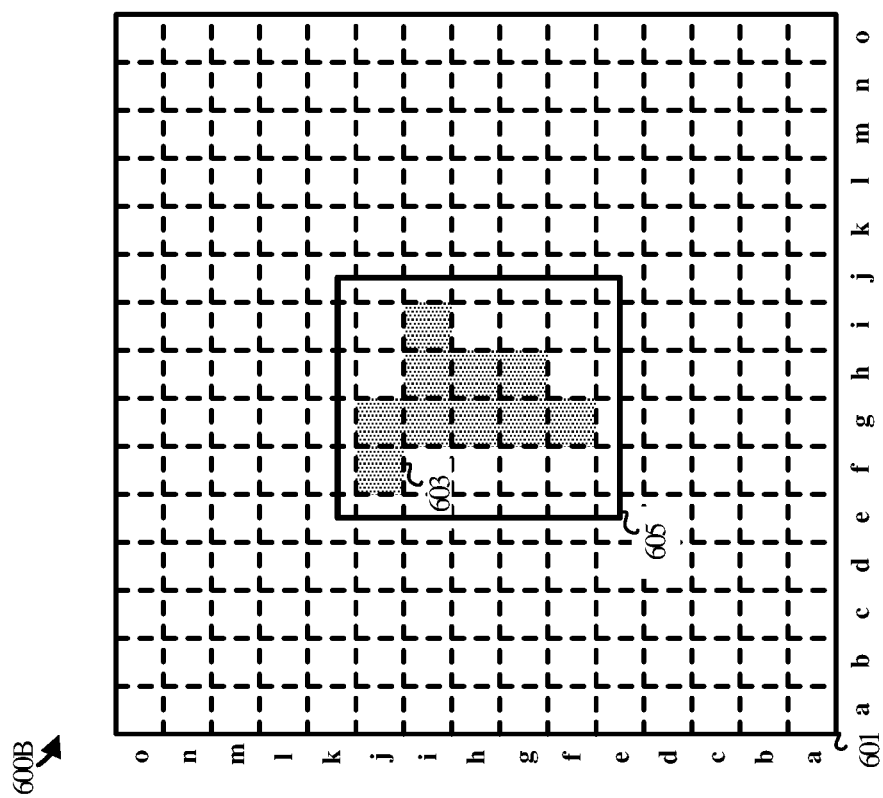
Figure 6C:
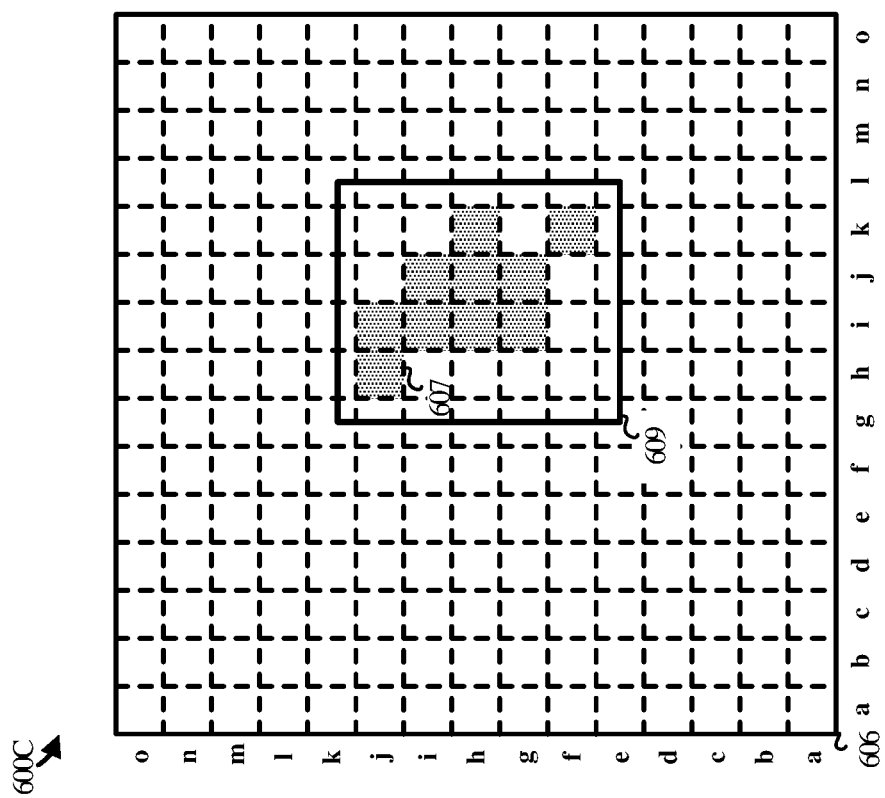

For instance, in FIG. 6C, which illustrates frame 606, bounding box 609 has been calculated for cluster 607. The dimensions of bounding box 609 may be compared to those of bounding box 605. Since the size of the two boxes are the same, a determination may be made that motion has occurred in the scene captured in the two frames. Alternatively, the bounding box comparison may serve as a confirmatory step subsequent to a conclusion that cluster 607 and cluster 603 are the same.

Figure 6D:
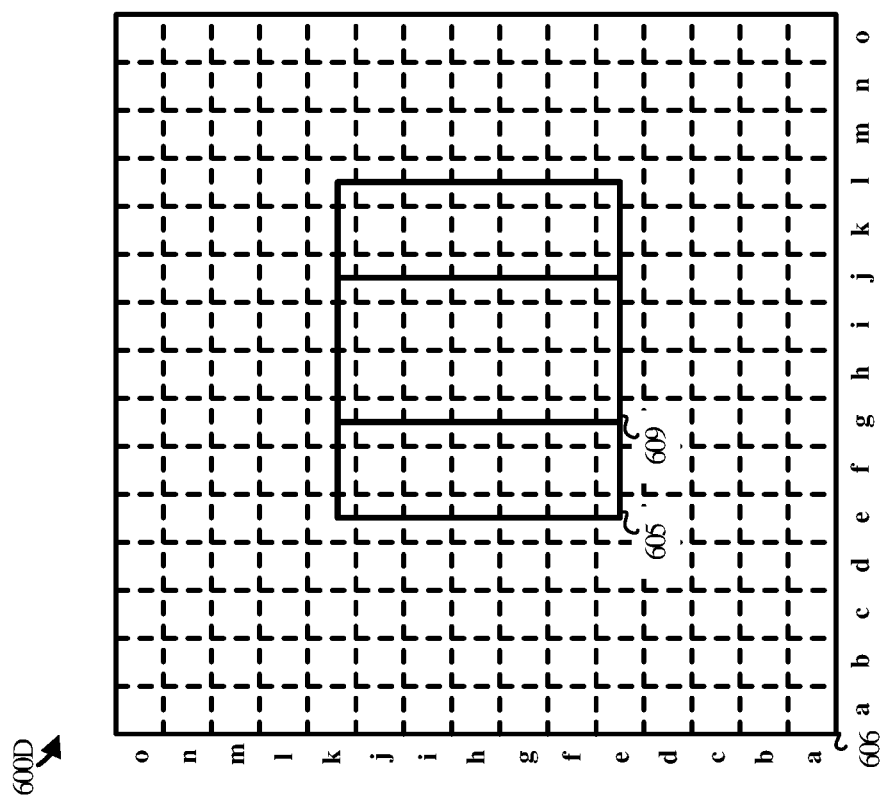

Alternatively, or in addition to the analysis provided with respect to FIG. 6C, the overlap of one bounding box relative with respect to another may be analyzed to determine if there is motion. FIG. 6D illustrates bounding box 609 and its overlap with bounding box 605. A substantial amount of overlap (e.g. half or more) of one box with respect to another may indicate that motion has occurred.

Figure 7A:
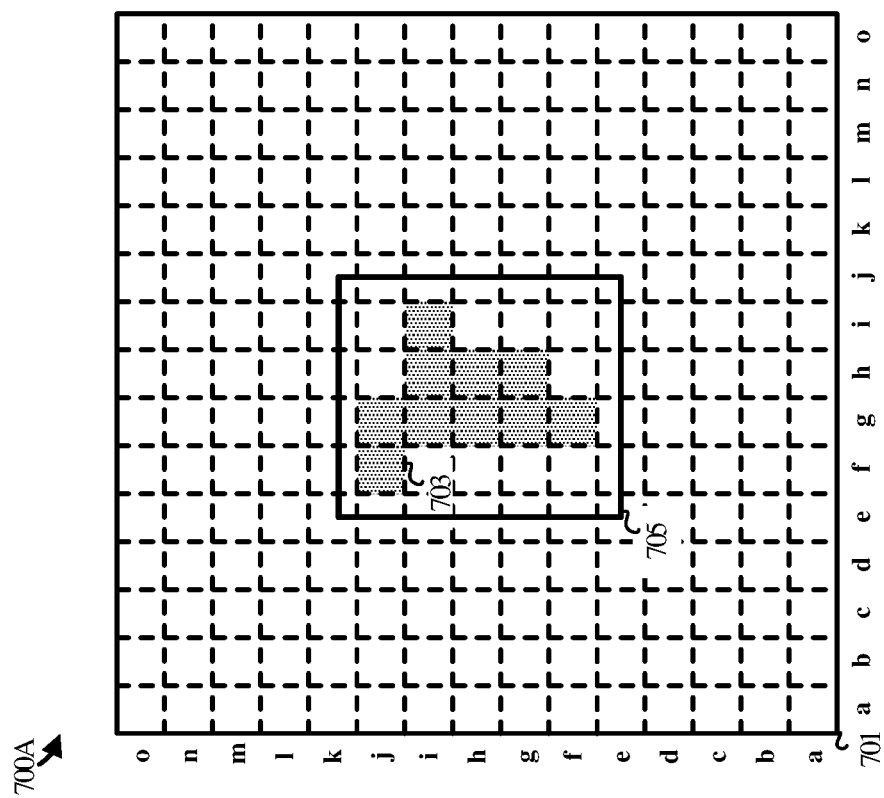
FIGS. 7A-7C illustrate box bounding and tracking in an implementation.
Figure 7B:
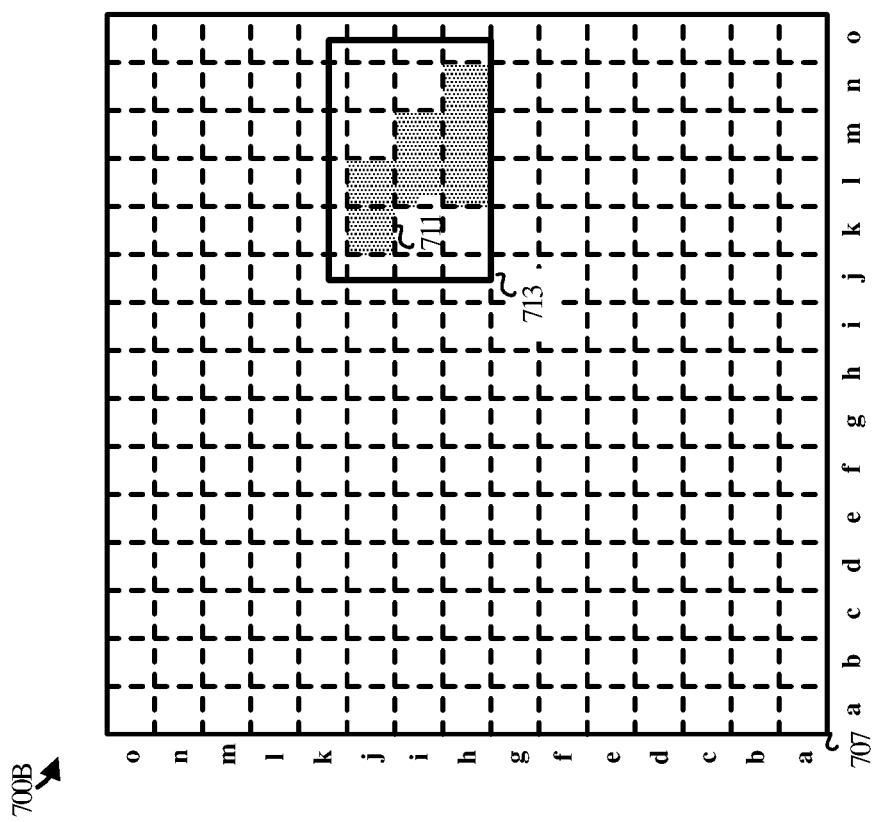
Figure 7C:
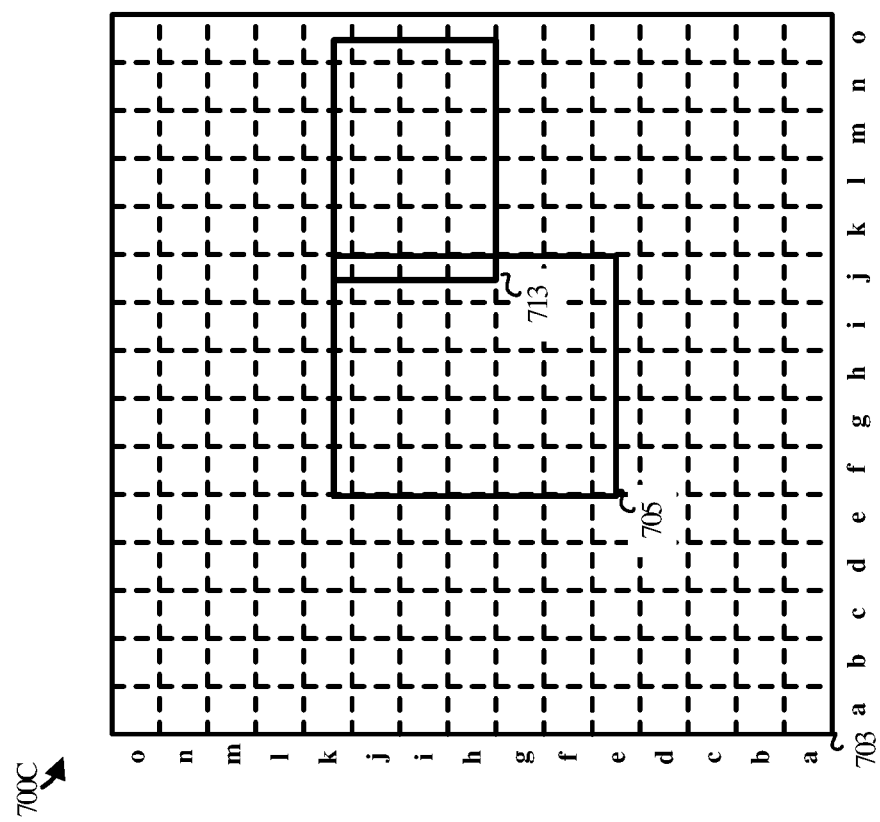

In contrast, FIGS. 7A-7C illustrate a scenario where little overlap has occurred and therefore a determination of no motion may be made. FIG. 7A in step 700A includes frame 701 in which a bounding box 705 is calculated for cluster 703. Step 700B in FIG. 7B shows a subsequent frame 707 in which a new cluster 711 has a bounding box 713 calculated for it. Two aspects may be appreciated: the new cluster 711 is substantially smaller than cluster 703; and bounding box 713 is substantially smaller than bounding box 715. Either or both facts may lead to a determination that motion has not occurred.

Step 7C in FIG. 7C illustrates the overlap of the two bounding boxes, which may further support the determination of no motion. As can be seen, bounding box 713 overlaps only slightly with bounding box 705. Such little overlap from one frame to the next may indicate that the two clusters were created from artifacts in the video or other dynamics in the scene other than the motion of a single figure, an object, or the like.

The amount of overlap that triggers a determination of motion may be set programmatically. In some cases, it may be dynamic such that it may change over time based on an analysis of the motion detection process. The amount of overlap required to trigger a determination of motion may also change based on the environment of a scene, the speed of a scene, or other factors.

In scenarios where the bounding box is close or identical in position and size to that of a previous frame, motion may still have occurred, such as a small object rotating in place. Depending on whether this type of motion is useful, this may be accepted or rejected.

In cases where a bounding box can be tracked over several frames, the position could be used to identify a path taken, including a direction. Examples might include crossing a property boundary or entering from—but not leaving—a restricted area. A trajectory could also be calculated and used for further calculations to predict object behavior. Object tracking and predictions derived from this data could be considered a first pass approach and validation of the subject within the tracked region should be performed to prevent false positives in potentially hazardous environments such as autonomous vehicles.

It may be appreciated that the enhanced motion detection disclosed herein may be implemented with stationary cameras as well as pan-tilt-zoom (PTZ) cameras. However, the technique could also be applied to free-moving cameras, such as on autonomous vehicle by subtracting the average motion vector from the whole image. As mentioned, the technique may also be implemented with integrated cameras, such as those in laptop, televisions, or the like.

FIG. 8 illustrates computing system 801 that is representative of any system or collection of systems in which the various processes, programs, services, and scenarios disclosed herein may be implemented. Examples of computing system 801 include, but are not limited to, server computers, cloud computing platforms, and data center equipment, as well as any other type of physical or virtual server machine, container, and any variation or combination thereof. Other examples include desktop computers, laptop computers, table computers, Internet of Things (IoT) devices, wearable devices, and any other physical or virtual combination or variation thereof.

Computing system 801 may be implemented as a single apparatus, system, or device or may be implemented in a distributed manner as multiple apparatuses, systems, or devices. Computing system 801 includes, but is not limited to, processing system 802, storage system 803, software 805, communication interface system 807, and user interface system 809 (optional). Processing system 802 is operatively coupled with storage system 803, communication interface system 807, and user interface system 809.

Processing system 802 loads and executes software 805 from storage system 803. Software 805 includes and implements motion detection process 806, which is representative of the motion detection processes discussed with respect to the preceding Figures. When executed by processing system 802 to provide packet rerouting, software 805 directs processing system 802 to operate as described herein for at least the various processes, operational scenarios, and sequences discussed in the foregoing implementations. Computing system 801 may optionally include additional devices, features, or functionality not discussed for purposes of brevity.

Referring still to FIG. 8, processing system 802 may comprise a micro-processor and other circuitry that retrieves and executes software 805 from storage system 803. Processing system 802 may be implemented within a single processing device but may also be distributed across multiple processing devices or sub-systems that cooperate in executing program instructions. Examples of processing system 802 include general purpose central processing units, graphical processing units, application specific processors, and logic devices, as well as any other type of processing device, combinations, or variations thereof.

Storage system 803 may comprise any computer readable storage media readable by processing system 802 and capable of storing software 805. Storage system 803 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 803 may also include computer readable communication media over which at least some of software 805 may be communicated internally or externally. Storage system 803 may be implemented as a single storage device but may also be implemented across multiple storage devices or sub-systems co-located or distributed relative to each other. Storage system 803 may comprise additional elements, such as a controller, capable of communicating with processing system 802 or possibly other systems.

Software 805 (including motion detection process 806) may be implemented in program instructions and among other functions may, when executed by processing system 802, direct processing system 802 to operate as described with respect to the various operational scenarios, sequences, and processes illustrated herein. For example, software 805 may include program instructions for implementing a motion detection process to learn motion in video as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 805 may include additional processes, programs, or components, such as operating system software, virtualization software, or other application software. Software 805 may also comprise firmware or some other form of machine-readable processing instructions executable by processing system 802.

In general, software 805 may, when loaded into processing system 802 and executed, transform a suitable apparatus, system, or device (of which computing system 801 is representative) overall from a general-purpose computing system into a special-purpose computing system customized to provide motion detection. Indeed, encoding software 805 on storage system 803 may transform the physical structure of storage system 803. The specific transformation of the physical structure may depend on various factors in different implementations of this description. Examples of such factors may include, but are not limited to, the technology used to implement the storage media of storage system 803 and whether the computer-storage media are characterized as primary or secondary storage, as well as other factors.

For example, if the computer readable storage media are implemented as semiconductor-based memory, software 805 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 807 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 801 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A method for detecting motion in video, the method comprising:
dividing a frame of video into regions;
assigning motion vectors from the video to at least some of the regions;
determining a vector score for each one of the regions that comprises a representation of one or more motion vectors assigned to a given region;
filtering out one or more of the regions based at least on the vector score determined for each of the regions, resulting in a subset of the regions to divide into clusters;
dividing the subset of the regions into the clusters;
identifying a compactness score for each of the clusters, wherein the compactness score comprises a value representative of a closeness of each region of a cluster to each other;
filtering out one or more of the clusters based on the compactness score for each of the clusters, resulting in a subset of the clusters to track in at least one other frame of the video; and
identifying the motion in the video in response an appearance in at least the one other frame of the video of a cluster similar to at least one of the subset of the clusters.

2. The method of claim 1 wherein the vector score comprises a magnitude representation of the one or more motion vectors in the given region.

3. The method of claim 1 further comprising selecting the one or more of the clusters in response to the compactness score satisfying one or more criteria.

4. The method of claim 1 further comprising determining that the cluster is similar to the at least one of the subset of the clusters by comparing one or more of a location of the cluster, a size of the cluster, and a bounding box for the cluster to one or more of a location of the at least one of the subset of the clusters, a size of the at least one of the subset of the clusters, and a bounding box of the at least one of the subset of the clusters.

5. The method of claim 1 wherein the vector score for each of the regions comprises a sum of the one or more motion vectors.

6. The method of claim 5 further comprising calculating the sum of the one or more motion vectors for each of the regions using less than half of the one or more motion vectors in each region.

7. The method of claim 5 further comprising selecting the given region in response to an average motion vector for the given region satisfying one or more criteria.

8. A computing apparatus comprising:
one or more computer readable storage media;
a processing system operatively coupled to the one or more computer readable storage media; and
program instructions stored on the one or more computer readable storage media for detecting motion in video that, when executed by the processing system, direct the computing apparatus to at least:
divide a frame of video into regions;
determine a vector score for each of the regions, wherein the vector score comprises a representation of zero or more motion vectors in each of the regions;
exclude at least some of the regions from further analysis based on the vector score determined for each of the regions, resulting in a subset of the regions to divide into clusters;
divide the subset of the regions into the clusters;
identify a compactness score for each of the clusters, wherein the compactness score comprises a value representative of a closeness of each region of a cluster to each other;
filter out one or more of the clusters based on the compactness score for each of the clusters, resulting in a subset of the clusters to track in at least one other frame of the video; and
identify the motion in the video in response to an appearance in at least the one other frame of the video of a cluster similar to at least one of the subset of the clusters in the frame.

9. The computing apparatus of claim 8 wherein the program instructions further direct the computing apparatus to:
determine that the cluster is similar to the at least one of the clusters by comparing one or more of a location of the cluster, a size of the cluster, and a bounding box for the cluster to one or more of a location of the at least one of the subset of the clusters, a size of the at least one of the subset of the clusters, and a bounding box of the at least one of the clusters.

10. The computing apparatus of claim 8 wherein the vector score for each of the regions comprises a magnitude representation of one or more motion vectors.

11. The computing apparatus of claim 10 wherein the program instructions further direct the computing apparatus to calculate the magnitude representation for each of the regions using only a fraction of all motion vectors in each region.

12. The computing apparatus of claim 10 wherein to exclude the at least some of the regions based on the vector score determined for each of the regions, the program instructions direct the computing apparatus to exclude a given region in response to the magnitude representation for the given region not satisfying one or more criteria.

13. The computing apparatus of claim 8 wherein the vector score for each of the regions comprises a sum of one or more motion vectors in a given region.

14. The computing apparatus of claim 9 wherein the program instructions direct the computing apparatus to select the one or more of the clusters in response to the compactness score satisfying one or more criteria.

15. One or more non-transitory computer readable storage media having program instructions stored thereon that, when executed by a processor, direct a computing apparatus to at least:
divide a frame of video into regions;
identify a vector score for each of the regions;
filter out one or more of the regions based on the vector score identified for each of the regions, resulting in a subset of the regions to divide into clusters;
divide the subset of the regions into the clusters;
identify a cluster metric for each of the clusters, wherein the cluster metric comprises a value representative of a closeness of each region of a cluster to each other;
filter out, based on the cluster metric identified for each of the clusters, one or more of the clusters, resulting in a subset of the clusters to track from the frame to at least one other frame of the video; and identify motion in the video in response to a cluster appearing in the at least one other frame of the video that is similar to at least one of the one or more of the clusters.

16. The one or more non-transitory computer readable storage media of claim 15 wherein the vector score for each of the regions comprises an average of one or more motion vectors in a given region.

17. The one or more non-transitory computer readable storage media of claim 16 wherein the program instructions further direct the computing apparatus to calculate the average of the one or more motion vectors for each of the regions using only a fraction of all motion vectors in each region.

18. The one or more non-transitory computer readable storage media of claim 17 wherein the fraction comprises one of approximately ¼ and approximately ⅛.

19. The one or more non-transitory computer readable storage media of claim 16 wherein the program instructions further direct the computing apparatus to select an average motion vector for the given region.

20. The one or more non-transitory computer readable storage media of claim 15 wherein the cluster metric comprises a compactness of each of the clusters.

\* \* \* \* \*